United States Patent [19]
Sklarski et al.

[11] Patent Number: 4,783,365
[45] Date of Patent: Nov. 8, 1988

[54] MICA PRODUCT

[75] Inventors: Dennis J. Sklarski, Deerfield; Arthur F. Doyle, Portsmouth, both of N.H.

[73] Assignee: Essex Group, Inc., Fort Wayne, Ind.

[21] Appl. No.: 124,350

[22] Filed: Nov. 20, 1987

Related U.S. Application Data

[60] Continuation of Ser. No. 935,364, Nov. 26, 1986, abandoned, which is a division of Ser. No. 849,936, Apr. 9, 1986, Pat. No. 4,683,162.

[51] Int. Cl.$^4$ .............................................. B32B 31/26
[52] U.S. Cl. ................................ 156/307.7; 428/454; 428/446; 156/307.4
[58] Field of Search ............... 428/363, 182, 446, 454; 156/307.4, 307.7

[56] References Cited

U.S. PATENT DOCUMENTS

| | | | |
|---|---|---|---|
| 1,975,078 | 10/1934 | Boughton | 154/2.6 |
| 2,810,425 | 10/1957 | Heyman | 154/2.6 |
| 2,865,426 | 12/1958 | Heyman | 154/2.6 |
| 2,914,426 | 11/1959 | Gaines, Jr. | 117/118 |
| 2,930,727 | 3/1960 | Baranyi | 156/307.4 |
| 2,949,150 | 8/1960 | Traynor, Jr. | 154/2.6 |
| 4,122,062 | 10/1978 | Monte et al. | 260/42.14 |
| 4,286,010 | 8/1981 | Staley et al. | 428/215 |
| 4,371,579 | 2/1983 | McCaskey et al. | 428/204 |
| 4,374,892 | 2/1983 | Roberts | 428/233 |
| 4,637,852 | 1/1987 | Sklarski et al | 428/454 |

FOREIGN PATENT DOCUMENTS 0179731  3/1986  European Pat. Off.

OTHER PUBLICATIONS

Article entitled "Processing of Composites with New Neoalkoxy Titanate Coupling Agents" by Salvatore J. Monte and G. Sugerman, Apr. 10–11, 1984.
Article entitled "Titanate Coupling Agents—Developments 1981" by S. J. Monte and G. Sugerman, Jul.-Aug. 1983.

*Primary Examiner*—Edith Buffalow

[57] ABSTRACT

A highly flexible mica insulating structure is disclosed which comprises one or more mica papers impregnated with about 5 percent to about 25 percent by weight of a flexible polysiloxane resin having about 1 percent to about 4 percent by weight of an alkoxy titanate and about 0.5 percent to about 2 percent by weight of a naphthenate based on polymer solids, said resin binder being partially cured or B-staged. Such mica products have excellent flexibility, structural integrity and improved moisture resistance.

2 Claims, No Drawings

MICA PRODUCT

This is a continuation of Ser. No. 935,364, filed Nov. 26, 1986, now abandoned; which is a division of Ser. No. 849,936 filed Apr. 9, 1986, now U.S. Pat. No. 4,683,162.

CROSS REFERENCE TO RELATED APPLICATIONS

This application relates to U.S. application Ser. No. 627,244, filed July 2, 1984 for HIGH DENSITY MOISTURE RESISTANT MICA SHEET By A. Doyle and D. Sklarski; U.S. application Ser. No. 649,348, filed Aug. 11, 1984 for HIGH DENSITY, MOISTURE RESISTANT MICA CYLINDERS by A. Doyle and D. Sklarski and U.S. application Ser. No. 663,535, filed Oct. 22, 1984 for NEOALKOXY TITANATE IN HIGH DENSITY MICA LAMINATES by D. Sklarski and A. Doyle now U.S. Pat. No. 4,603,088. These applications are hereby incorporated by reference.

TECHNICAL FIELD

The field of art to which this invention pertains is mica containing laminate material.

BACKGROUND ART

Mica containing articles have been used for many years as electrical insulation structures or for thermal insulation. Typically, such mica articles are structures formed by bonding mica sheeting with a bonding agent such as a nonsilicone or a silicone material. Such articles have good dielectric strength, heat stability and are relatively inexpensive. Such articles are used as supporting insulation for high temperature thermostats, control devices, strip heaters and baseboard heaters. In addition, they are also used for gaskets and spacers in other electrical appliances. However, these mica products are susceptible to attack by moisture, and may do not offer the flexibility or conformability required for certain applications.

Therefore, what is needed in the art is a mica composite material which overcomes such problems.

DISCLOSURE OF THE INVENTION

The present invention is directed toward a relatively high density, flexible, mica sheet comprising one or more mica paper layers which are impregnated with about 5 percent to about 25 percent by weight of a flexible, methyl-phenyl polysiloxane or flexible methyl polysiloxane binder which contains an organic monoalkoxy or neoalkoxy titanate and a metal naphthenate and which has been formed such that the density of the mica sheet is greater than about 1.5 g/cc. Such mica sheet is more moisture resistant, thermally stable, dimensionally stable, and stronger than prior mica products. In addition, such a material is conformable and has improved machinability and punchability qualities.

Another aspect of the invention is a method of forming such flexible laminates by impregnating mica paper with about 5 percent to about 25 percent by weight of a flexible, methyl-phenyl polysiloxane or flexible methyl silicone binder which contains an organic, alkoxy or neoalkoxy titanate and a metal naphthenate, placing one or more impregnated papers on top of each other and densifying and gelling to B-stage the binder under pressure and temperature to form a laminate or sheet.

Other objects, features and advantages of the present invention will become more apparent from the following detailed description of the preferred embodiment.

Best Mode for Carrying Out the Invention

The mica paper used to practice this invention may comprise any continuous, thin mica paper, however, those made from muscovite or phlogopite mica are preferred. Which material is selected depends on the properties desired in the end product. Typically, where high dielectric properties are desired, muscovite will be used, whereas, if high temperature properties are desired, the phlogopite is generally selected. The mica paper is typically in the form of conventional water-disintegrated, integrated mica paper which may be prepared using conventional techniques. The thickness of the mica paper characteristically ranges from about 1 mil to about 20 mils with about 5 mils being preferred.

The binder which is used to form the mica laminate comprises any of the thermally cross-linkable flexible, methyl-phenyl silicone or methyl silicone polymer systems which are used to form other mica laminates. The selection of which system to use depends on the properties desired in the final laminate. Since many of the mica laminates find uses in high temperature environments above 359° F. (180° C.), it is preferred that the binder system used be thermally stable at these elevated temperatures. The preferred systems are the polysiloxane polymers which are conventionally used in this field. The most preferred systems are methyl-phenyl polysiloxane or flexible methyl polysiloxane which are available from Dow Corning Corporation, Midland, Mich., as Dow Corning 997, Dow Corning 994 and General Electric resins SR-224, SR-165 and SR-32. It should be noted that the polysiloxane system used to practice this invention should not condense or outgas excessively while curing or gelling, for this may cause the formation of a defective laminate through the formation of blisters or voids in the laminate.

Any compatible organic alkoxy or neoalkoxy titanate may be mixed with the polymer system in the range from about 1 percent to about 4 percent by weight of polymer solids with about 2 percent being preferred. The alkoxy titanates which are most useful are those which are soluble in the polymer system, i.e. methyl polysiloxane, and do not promote rapid cross-linking of the polymer which will shorten the shelf life of the system. Whether a particular alkoxy titanate causes too rapid cross-linking or not is dependent on the manufacturing process which is used to form the laminates. A manufacturing process which is fast, may tolerate a faster cross-linking process while a slower process will produce an inferior product. Some typical monoalkoxy titanates and neoalkoxy titanates are listed in Table I, with the preferred neoalkoxy titanate being neoalkoxy, tri(dioctylpyrophosphato)titanate and the preferred monoalkoxy titanate being Isopropyl tri(dioctylpyrophosphato)titanate.

All of these titanates are available from Kenrich Petrochemical Corporation of Bayonne, N.J.

TABLE I

Isopropyl, triisostearoyl titanate,
Isopropyl, trimethacryl titanate,
Isopropyl, triacryltitanate,
Isopropyl, tri(tetraethylenetriamino)titanate,
Isopropyl, tri(dioctylphosphato)titanate,
Isopropyl, tri(dioctylpyrophosphato)titanate, Tri(butyl, octyl pyrophosphato)isopropyl titanate mono(dioctyl, hydrogen phosphite),
Tetraisopropyl di(tridecylphosphito)titanate,
Neoalkoxy, triisostearoyl titanate,
Neoalkoxy, dodecylbenzenesulfonyl titanate
Neoalkoxy, tri(dioctylphosphato)titanate,
Neoalkoxy, tri(dioctylpyrophosphato)titanate.

Conventional metal naphthenate driers are added to the base polymer in concentrations from about 0.5 percent to about 2 percent, by weight of the polymer, with about 1 percent being preferred. Examples of such metallic soap driers are manganese naphthenate, zinc naphthenate, tin naphthenate, cobalt naphthenate, etc. It is believed that the addition of these naphthenate driers coupled with the titanate are what give these mica laminates their superior moisture resistant properties and the superior bonding of the mica platelets resulting in the improved structure of the present invention. A binder solution containing the above constituents to be applied to the mica paper, is typically prepared as follows:

Solvent is placed in a container in which the binder will be prepared. Such solvents are typically aromatic hydrocarbons in which all of the constituents are compatible such as toluene or xylene. The amount of solvent is not critical and is typically in the range of from about 40 percent to about 60 percent of the total weight of the final solution.

The titanate is then added to the solvent and is stirred until the titanate is dissolved and the solution is clear. Typically, this is done at ambient temperatures about 50° F. (15° C.) to about 85° F. (30° C.). While the stirring continues, the naphthenate drier is added to the solution and stirred until dissolved. Again, this is done at ambient temperatures. To this solution is then added the polysiloxane and the mixture is stirred until homogenous, typically for about one-half hour to one hour at ambient temperatures. The polysiloxane is added in quantities such that the titanate and naphthenate will be in the proper concentrations of the final binder chemistry.

The mica paper is removed from the roll and placed on a flat surface, i.e. a table, conveyer belt, etc., and the paper is impregnated with the binder by any conventional technique, i.e. dripping. The amount of the binder (after the solvent is removed) applied is such that the final laminate contains about 5 percent to about 25 percent by weight binder with the preferred being 5 to 15 percent and the application should be such that the binder is evenly distributed throughout the laminate. Other conventional impregnation techniques may be used to apply the binder to the paper such as dipping, or roll soaking, spraying, brushing, etc., and in certain processes, it may be desirable to coat both sides of the paper. The aromatic solvent present in the binder is then removed by exposing the impregnated paper to temperatures high enough to cause the solvent to evaporate, but not so high as to cause the polymer to polymerize. Typically, these temperatures are about 250° F. (121° C.) to about 275° F. (135° C.). Typically, this is done by passing the paper through an oven or exposing it to radiant heat, etc.

The solvent free paper is then cut into the desired size and stacked one on top of the other to the desired thickness. (A single sheet of impregnated paper may be used if desired.) Such thicknesses will typically vary from about 5 mils to about 62 mils or more. The number of layers required to achieve a given thickness will, of course, vary depending on the thickness of the mica paper, as well as the curing pressures. Typically, these precured laminates are made to allow for a loss in thickness after densification of about 10 percent to about 20 percent or possibly higher. The orientations of the sheets may be in any direction and is not critical. The stack is then placed in a press which is capable of generating pressures of between 50 psi to 1,000 psi or higher, and temperatures above about 300° F. (148.9° C.), wherein the heat and pressure uniformly distributes the resin throughout the laminate and also advances the cure of the resin system. The laminate is then cooled to about 100° F. (37.8° C.) while still under pressure and then removed from the press. Typically the time required to advance the cure to an acceptable extent ranges from about fifteen minutes to several hours depending on the particular resin system used. It is not the object of this step to totally cure or cross-link the resin system, as this makes the laminate very stiff. Therefore, it is advisable to B-stage or gel the resin so as to retain sufficient flexibility in the laminate while imparting sufficient cross linking to give the laminate good adhesion and moisture resistance. The degree of B-staging or gelling required for any particular laminate system will vary depending on the thickness of the laminate as well as the resin system used. The length of time required for this is varied, however it is easily determined with simple experimentation. Any conventional press, which can achieve and maintain the prescribed pressures and temperatures, may be used. Typically, the laminate stack is placed in the press between two platens. If more than one laminate is to be formed during a single curing process, a separator sheet, typically of Teflon ® coated glass, is inserted between the stacks as they are placed in the press. Although any number of techniques may be employed to advance the cure of the polymer while it is under pressure, the preferred technique is to heat the platens through either electrical, steam, hot oil or other means to the desired temperature. It is desirable to have a release sheet or coating between the platens and the laminates to ensure an easy removal of the densified laminates from the press after curing.

Typically, the process will entail slowly raising the laminate to the maximum densification conditions which will allow for any outgassing of the material prior to final densification. This can be done in a stepwise manner or by gradually increasing the temperature and pressure. In addition, it should be noted again, that the cycle should not allow the polysiloxane binder to B-stage prematurely, preventing the laminate from being fully densified, resulting in an inferior product. Preferably, these parameters can be controlled by conventional electrical or computer control systems which would interface with the press.

The mica laminates formed using the present invention, typically range in thicknesses from about 10 mils to about ¼ inch or thicker and have densities of about 1.5 g/cc to about 2.0 g/cc.

EXAMPLE I

A typical mica laminate was prepared from two sheets of 5 mils muscovite mica paper which had been impregnated with 10 percent of the polysiloxane binder GE SR-224 containing 2 percent of monoalkoxy, isopropyl tri(dioctylpyrophosphato)titanate and 1 percent zinc naphthenate containing 8 percent zinc (Nuodex Products Div.). The impregnated paper was then stacked, two plies of 5 mils one on top of the other, placed between release sheets in the press, and B-staged for fifteen minutes at 350° F. (177° C.) and 100 psi. The laminate was then allowed to cool to below 100° F. (37.8° C.) while under pressure and then removed from the press. The release sheets were then removed from the press.

TABLE II

|  | 10 mil silicone | 10 mil new chemistry |
|---|---|---|
| Dielectric strength in VPM | 519 | 538 |
| Dielectric strength after 24 hrs. @ 96% RH | 469 | 519 |
| Dielectric strength after 24 hrs. water immersion (wet) | — | 393 |
| Dielectric strength after 24 hrs. drying in desiccator | — | 516 |
| Tensile Strength (PSI) | 51 | 53 |
| Water absorption (%) in weight after 24 hrs. | — | 18.1 |
| Gurley stiffness milligrams | 6116 | 5191 |
| Arc Resistance seconds | 249 | 225 |

— indicates that the sample had deteriorated so much that the test could not be performed.

The results of the new flexible product prepared with the new chemistry compared with the same product without the chemistry, demonstrates the unique properties of these products in which they are flexible yet substantially possess excellent dielectric strength upon exposure to moisture as shown in Table II. Also compared in this Table are mica laminates using only a flexible silicone resin system without the titanate and naphthenate demonstrating how this product totally loses its dielectric strength to the point where it is not possible to test such a property once it is immersed in water for a 24 hour period.

No other known mica laminate possesses these qualities. Another surprising result is that this method allows for production of a thermally stable, moisture resistant, mica laminate up to about ¼ inch in thickness or thicker.

In conclusion, the mica laminates prepared using the present method have remarkable and surprisingly different properties than other mica laminates produced in the past. The present laminates are well bonded and have significantly greater mechanical and dielectric strength. Such novel laminates again, will allow for their use in many new and novel applications, as well as those conventional applications described earlier in the Background.

It should be understood that the invention is not limited to the particular embodiments shown and described herein, but that various changes and modifications may be made without departing from the spirit and scope of this novel concept as defined by the following claims.

We claim:

1. A method of making a flexible mica insulation comprising:

individually impregnating at least one mica paper with about 5 percent to about 25 percent by weight of a flexible polysiloxane binder containing about 1 percent to about 4 percent by weight of a monoalkoxy or a neoalkoxy titanate and about 0.5 percent to about 2 percent by weight of a naphthenate based on polymer solids in an aromatic solvent, removing the solvent, densifying the impregnated paper and B-staging the resin binder under heat and pressure.

2. The method of claim 1 wherein two or more impregnated mica papers are stacked one on the other prior to densifying and B-staging.

* * * * *